United States Patent
Long

(10) Patent No.: US 8,291,789 B2
(45) Date of Patent: Oct. 23, 2012

(54) ROBOT ARM ASSEMBLY AND ROBOT USING THE SAME

(75) Inventor: Bo Long, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 95 days.

(21) Appl. No.: 12/785,424

(22) Filed: May 21, 2010

(65) Prior Publication Data

US 2011/0154932 A1 Jun. 30, 2011

(30) Foreign Application Priority Data

Dec. 29, 2009 (CN) .......................... 2009 1 0312532

(51) Int. Cl.
 *B25J 17/00* (2006.01)
 *B25J 17/02* (2006.01)
 *B25J 18/00* (2006.01)
(52) U.S. Cl. ..................... 74/490.05; 74/490.01; 901/19
(58) Field of Classification Search ............... 74/490.03, 74/490.05, 490.06; 901/19, 28
 See application file for complete search history.

(56) References Cited

U.S. PATENT DOCUMENTS

| | | | | |
|---|---|---|---|---|
| 4,697,472 A * | 10/1987 | Hiyane | ...................... | 74/490.02 |
| 4,846,015 A * | 7/1989 | Keppler et al. | .......... | 74/665 GC |
| 6,408,224 B1 * | 6/2002 | Okamoto et al. | ............. | 700/245 |
| 7,013,750 B1 * | 3/2006 | Kazami | ...................... | 74/490.05 |
| 8,029,229 B2 * | 10/2011 | Aiken | ........................... | 414/729 |
| 8,109,170 B2 * | 2/2012 | Jinushi et al. | .............. | 74/490.01 |
| 2008/0216596 A1 * | 9/2008 | Madhani et al. | ........... | 74/490.05 |
| 2009/0114054 A1 * | 5/2009 | Horiuchi et al. | ........... | 74/490.05 |
| 2011/0259137 A1 * | 10/2011 | Long | ......................... | 74/490.05 |
| 2011/0265597 A1 * | 11/2011 | Long | ......................... | 74/490.05 |
| 2012/0048047 A1 * | 3/2012 | Zhang | ............................ | 74/425 |
| 2012/0085191 A1 * | 4/2012 | Long | ................................ | 74/423 |
| 2012/0096973 A1 * | 4/2012 | Bicchi et al. | ............... | 74/490.03 |
| 2012/0103127 A1 * | 5/2012 | Liu | ............................. | 74/490.06 |

* cited by examiner

*Primary Examiner* — Justin Krause
(74) *Attorney, Agent, or Firm* — Altis Law Group, Inc.

(57) ABSTRACT

A robot arm assembly includes a support member, a first rotating member rotatably connected to the support member, a second rotating member rotatably connected to the first rotating member, and a driving mechanism to drive the first rotating member. The driving mechanism includes a gear transmission mechanism directly coupled to the first rotating member, a driver mounted on the support member and provided with an output shaft coupled to the gear transmission mechanism, and a support mechanism supporting the gear transmission mechanism.

12 Claims, 3 Drawing Sheets

ROBOT ARM ASSEMBLY AND ROBOT USING THE SAME

BACKGROUND

1. Technical Field

The present disclosure generally relates to robotic technologies, and particularly, to a robot arm assembly and a robot employing the robot arm assembly.

2. Description of Related Art

A commonly used robot arm includes a plurality of rotating members connected in series. An end effector, such as a welding device, a gripper or a cutting tool, is mounted at a distal arm of the robot to execution of specific tasks. Generally six axes are utilized to achieve maximum movement and positioning of the end effector. Each rotating member of the robot arm rotates around a rotation axis driven by a driving mechanism.

A typical robot arm assembly utilized in a six-axis robot includes several rotating members. Members are commonly connected in series and a member has a motor and controls movement via a belt of the next member connected in the series. However, because of the loose nature of the belt, the robot arm assembly employing the belt to transfer movement is not able to withstand impacts and is therefore easily damaged or misaligned.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
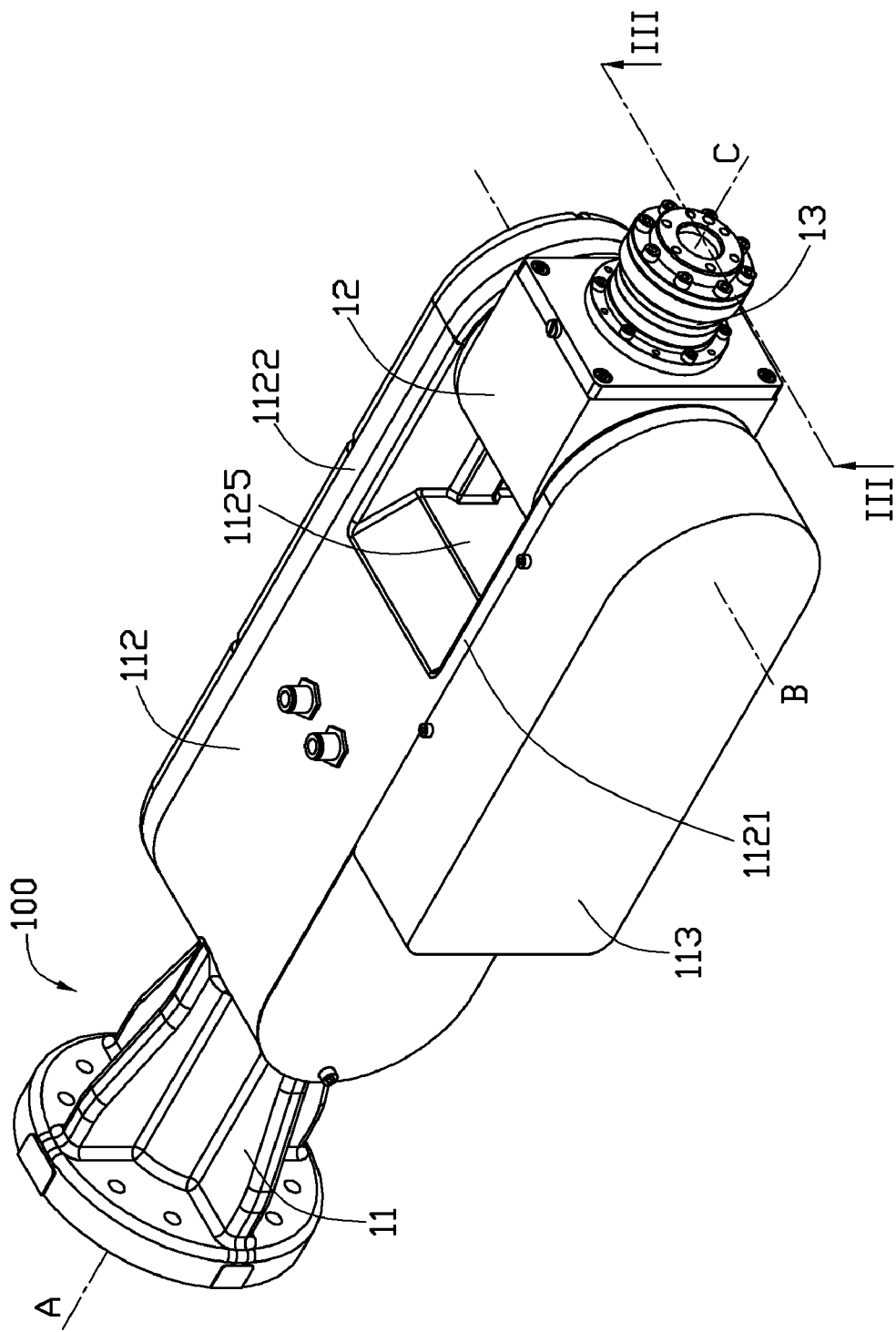
FIG. 1 is an isometric view of one embodiment of a robot arm assembly, the robot arm assembly is utilized in a six-axis robot.

Referring to FIG. 1, one embodiment of a robot arm assembly 100 according to the disclosure includes a support member 11, a first rotating member 12 rotatably connected to the support member 11, a second rotating member 13 rotatably connected to the first rotating member 12, and a driving mechanism (not shown) for driving the first rotating member 12. The robot arm assembly 100 may be utilized in a six-axis robot. The support member 11, the first rotating member 12 and the second rotating member 13 are rotatable about a fourth axis A, a fifth axis B, and a sixth axis C of the robot, respectively. The fifth axis B is substantially perpendicular to the fourth and sixth axes A, C. An end effector, such as a welding device, a gripper or a cutting tool, may be mounted at a distal end of the second rotating member 13.

Figure 2:
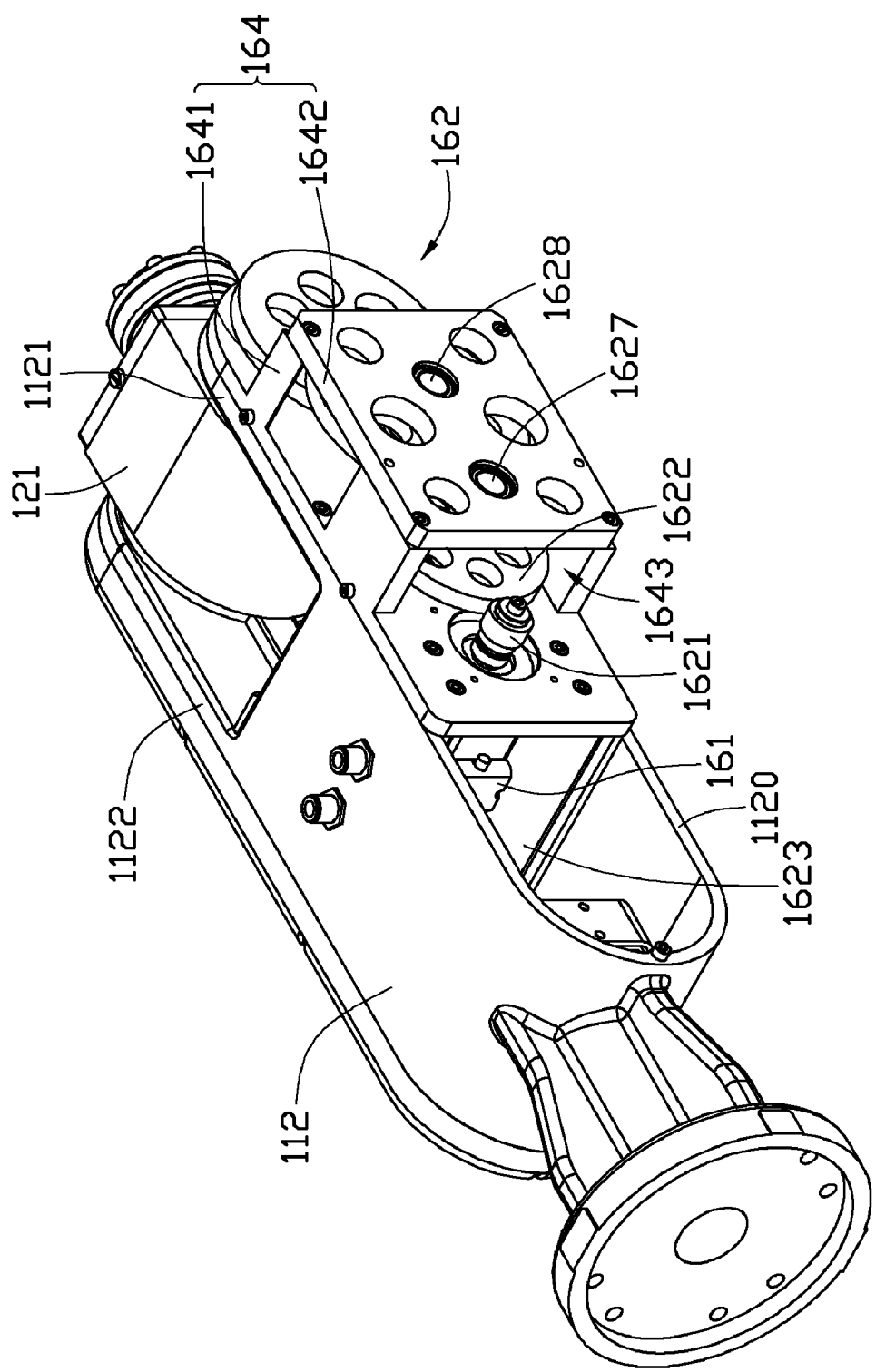
FIG. 2 is a partially isometric view of the robot arm assembly of the FIG. 1.

Referring to FIGS. 1 and 2, the support member 11 includes a main body 112 and a housing 113 connected to a side of the main body 112. The main body 112 is a two prong fork and includes a connection base 1120, a first prong 1121 and a second prong 1122 parallel to the first prong 1121. The connection base 1120 defines a first hollow portion 1123 (see FIG. 3) therein. The first and second prongs 1121, 1122 extend from one end of the connection base 1120 along the direction of the fourth axis A, and define a first receiving portion 1125 therebetween.

Figure 3:
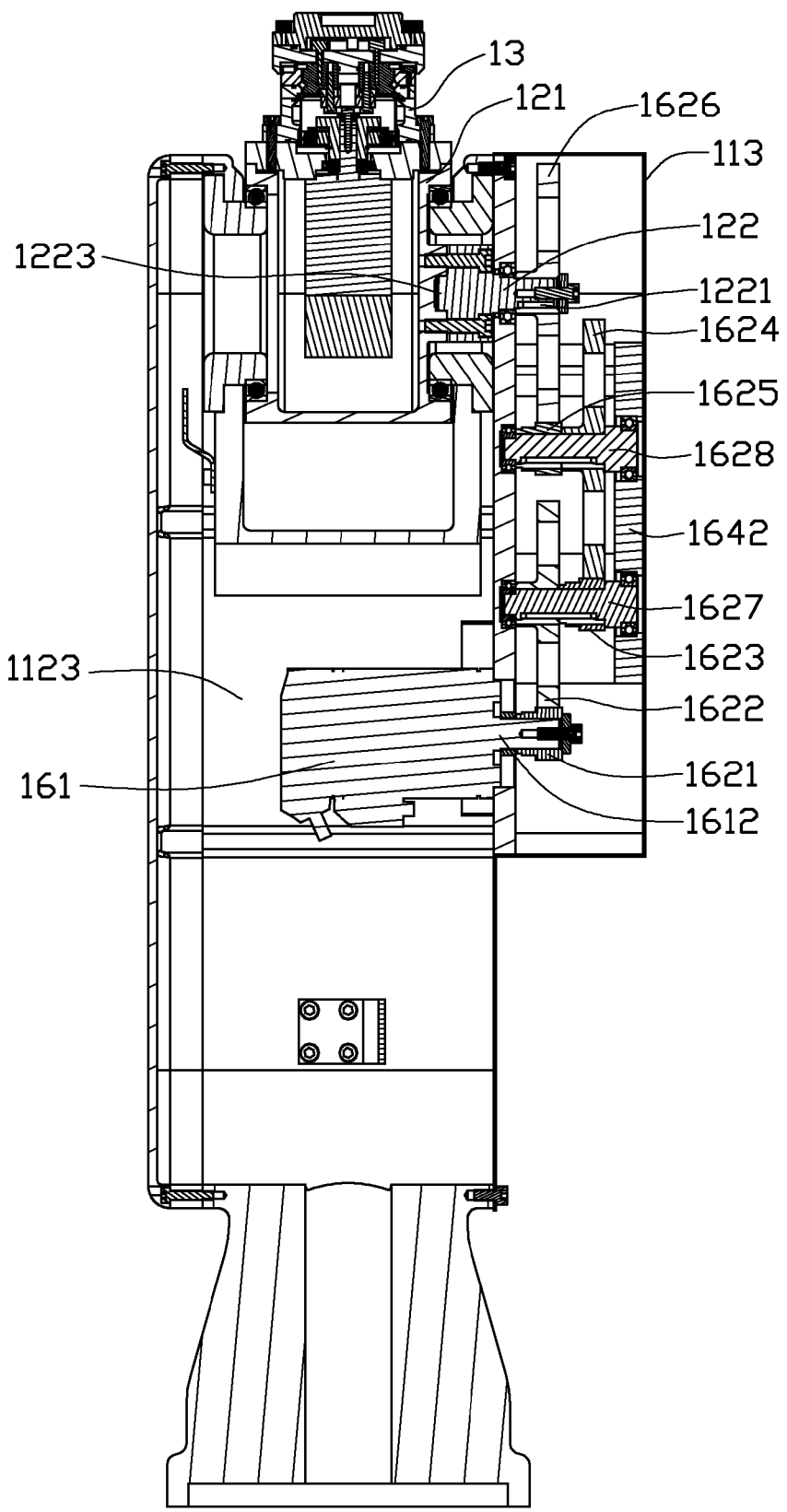
FIG. 3 is a cross section of the robot arm assembly of FIG. 1, taken along the line III-III.

Referring also to FIG. 3, the first rotating member 12 includes a rotation body 121 connected to the second rotating member 13 and a connection shaft 122 coupled to the driving mechanism. The first rotating member 12 is rotatably received in the first receiving portion 1125, with two opposite ends of the rotation body 121 along the fifth axis B being rotatably connected to the first and second prongs 1121, 1122, respectively. The rotation body 121 defines a second hollow portion (not labeled) therein to receive a driver mechanism (not labeled) for driving the second rotating member 13. The connection shaft 122 is rotatable about the fifth axis B and includes an input end 1221 and an opposite output end 1223. The input end 1221 is coupled to the driving mechanism to receive power from the driving mechanism, and the output end 1223 is fixed to the rotation body 121 to transfer the power from the driving mechanism to the first rotating member 12.

The driving mechanism includes a driver 161 for supplying power to rotate the first rotating member 12, a gear transmission mechanism 162 for achieving a desired speed, and a support mechanism 164 for supporting the gear transmission mechanism 162.

The driver 161 may be an electric motor received in the first hollow portion 1123 with an output shaft 1612 extending into the housing 113.

In this embodiment the gear transmission mechanism 162 is a three-stage type. The gear transmission mechanism 162 includes a first driving gear 1621 coupled to the driver 161, a first driven gear 1622 meshed with the first driving gear 1621, a second driving gear 1623 coaxial to the first driven gear 1622, a second driven gear 1624 meshed with the second driving gear 1622, a third driving gear 1625 coaxial to the second driven gear 1624, a third driven gear 1626 meshed with the third driving gear 1625 and coupled to the first rotating member 12. All gears of the gear transmission mechanism 162 may be beveled gears. It should be understood that, the gear transmission mechanism 162 may alternatively have more or less stages to achieve a desired speed. Because the gear transmission mechanism 162 utilizes gears to transfer the movement instead of belts, greater rigidity at the joints between rotating members can be achieved, accordingly, stability of the robot arm assembly 100 can be improved. Further, the gear transmission mechanism 162 can achieve higher precision and absorb higher stress and strain by using beveled gears to transfer the power, thus reducing noise and achieving an improved stability.

The gear transmission mechanism 162 further includes a first gear shaft 1627, and a second gear shaft 1628 connected to the support mechanism 164. The first driven gear 1622 and the second driving gear 1623 are mounted on opposite ends of the first gear shaft 1627, respectively. The second driven gear 1624 and the third driving gear 1625 are mounted on opposite ends of the second gear shaft 1628, respectively.

Referring to FIGS. 2 and 3 again, the support mechanism 164 includes a first support member 1641 and a second support member 1642 fixed to the first support member 1641. The first support member 1641 is fixed to a side of the first rotating member 12 where the first prong 1121 is formed. The first and second support members 1641, 1642 cooperatively define a second receiving portion 1643 where the gear transmission mechanism 162 is received. The first and second support members 1641, 1642 defines a plurality of shaft holes (not labeled) therein to receive corresponding ends of the first and second gear shafts 1627, 1628, thus facilitating the assembly of the gear transmission mechanism 162.

It should also be understood that the robot arm assembly 100 described is not limited to be utilized in a six-axis robot, and can alternatively be used in robots with fewer axes.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robot arm assembly comprising:
a support member;
a first rotating member rotatably connected to the support member;
a second rotating member rotatably connected to the first rotating member; and
a driving mechanism to drive the first rotating member, wherein the driving mechanism comprises a gear transmission mechanism directly coupled to the first rotating member, a driver mounted on the support member and provided with an output shaft coupled to the gear transmission mechanism, and a support mechanism supporting the gear transmission mechanism
wherein the support mechanism comprises a first support member and a second support member fixed to the first support member and cooperatively define a receiving portion to partially receive the gear transmission mechanism, the first support member comprises a bottom plate connected to the second support member and a plurality of support portions extending from an edge of the bottom plate, and the second support member is positioned on the support portions, the second support member is parallel to the bottom plate; the gear transmission mechanism comprises a first gear shaft rotatably positioned between the first support member and the second support member, and a second gear shaft parallel to the first gear shaft and rotatably positioned between the first support member and the second support member.

2. The robot arm assembly of claim 1, wherein the gear transmission mechanism further comprises a first driving gear coupled to the driver, a first driven gear meshed with the first driving gear and sleeved on the first gear shaft, a second driving gear sleeved on the first gear shaft and coaxial to the first driven gear, a second driven gear meshed with the second driving gear and sleeved on the second gear shaft, a third driving gear sleeved on the second gear shaft and coaxial to the second driven gear, and a third driven gear meshed with the third driving gear and coupled to the first rotating member.

3. The robot arm assembly of claim 1, wherein the first support member and the second support member define a plurality of holes therein to receive corresponding ends of the first gear shaft and the second gear shaft.

4. The robot arm assembly of claim 1, wherein the support member comprises a main body defining a hollow portion to receive the driver, and a housing connected to a side of the main body to receive the driving mechanism.

5. The robot arm assembly of claim 4, wherein the main body is includes a connection base, a first prong and a second prong parallel to the first prong, the first prong and the second prong extend from opposite sides of the connection base; the first prong and the second prong cooperatively define a receiving portion therebetween to receive the first rotating member.

6. The robot arm assembly of claim 5, wherein the driver is received in the connection base, and the support mechanism is connected to the first prong.

7. The robot arm assembly of claim 5, wherein the first rotating member comprises a rotation body connected to the second rotating member and a connection shaft coupled to the driving mechanism.

8. The robot arm assembly of claim 7, wherein opposite sides of the rotation body are rotatably connected to the first prong and the second prong of the support member, respectively.

9. A robot comprising:
a support member;
a first rotating member rotatably connected to the support member;
a second rotating member rotatably connected to the first rotating member, the second rotating member being mounted on a distal end of the robot; and
a driving mechanism to drive the first rotating member, wherein the driving mechanism comprises a gear transmission mechanism directly connected to the first rotating member, a driver mounted on the support member and provided with an output shaft connected to the gear transmission mechanism, and a support mechanism supporting the gear transmission mechanism;
wherein the support mechanism comprises a first support member and a second support member fixed to the first support member and cooperatively define a receiving portion to partially receive the gear transmission mechanism, the first support member comprises a bottom plate connected to the second support member and a plurality of support portions extending from an edge of the bottom plate, and the second support member is positioned on the support portions, the second support member is parallel to the bottom plate; the gear transmission mechanism comprises a first gear shaft rotatably positioned between the first support member and the second support member, and a second gear shaft parallel to the first gear shaft and rotatably positioned between the first support member and the second support member.

10. The robot arm assembly of claim 9, wherein the gear transmission mechanism further comprises a first driving gear coupled to the driver, a first driven gear meshed with the first driving gear and sleeved on the first gear shaft, a second driving gear sleeved on the first gear shaft and coaxial to the first driven gear, a second driven gear meshed with the second driving gear and sleeved on the second gear shaft, a third driving gear sleeved on the second gear shaft and coaxial to the second driven gear, and a third driven gear meshed with the third driving gear and coupled to the first rotating member.

11. The robot of claim 9, wherein the first support member and the second support member define a plurality of holes therein to receive corresponding ends of the first gear shaft and the second gear shaft.

12. The robot of claim 9, wherein the support member comprises a main body defining a hollow portion to receive the driver and a housing connected to one side of the main body to partially receive the gear transmission.

* * * * *